United States Patent
Holmes et al.

(10) Patent No.: US 8,806,771 B2
(45) Date of Patent: Aug. 19, 2014

(54) LOW IMPACT BELT DRYER

(76) Inventors: George A. Holmes, West Chicago, IL (US); Tadeuz Rybka, Streamwood, IL (US)

(*) Notice: Subject to any disclaimer, the term of this patent is extended or adjusted under 35 U.S.C. 154(b) by 393 days.

(21) Appl. No.: 13/147,422

(22) PCT Filed: Feb. 4, 2010

(86) PCT No.: PCT/US2010/023138
§ 371 (c)(1), (2), (4) Date: Oct. 25, 2011

(87) PCT Pub. No.: WO2010/091141
PCT Pub. Date: Aug. 12, 2010

(65) Prior Publication Data
US 2012/0060386 A1    Mar. 15, 2012

Related U.S. Application Data

(60) Provisional application No. 61/149,923, filed on Feb. 4, 2009.

(51) Int. Cl.
*F26B 17/30* (2006.01)

(52) U.S. Cl.
USPC ...... 34/59; 34/102; 34/618; 432/58; 432/121; 219/388; 219/413; 414/296

(58) Field of Classification Search
USPC ............... 34/58, 59, 102, 104, 105, 618, 621, 34/625; 432/58, 121; 219/388, 411, 413; 414/296, 291; 198/34.06
See application file for complete search history.

(56) References Cited

U.S. PATENT DOCUMENTS

| | | | | | |
|---|---|---|---|---|---|
| 2,176,902 | A | * | 10/1939 | Horrocks | 34/340 |
| 2,363,281 | A | * | 11/1944 | Arnold | 34/364 |
| 3,262,217 | A | * | 7/1966 | Brown et al. | 34/580 |
| 3,263,337 | A | * | 8/1966 | Sjogren | 34/487 |
| 3,492,740 | A | * | 2/1970 | Geipel et al. | 34/580 |
| 3,802,089 | A | * | 4/1974 | Stephanoff | 34/327 |
| 4,910,880 | A | | 3/1990 | Cole | |

(Continued)

FOREIGN PATENT DOCUMENTS

| | | | | |
|---|---|---|---|---|
| DE | 19504268 A1 * | 8/1996 | | B09C 1/00 |
| DE | 19846694 A1 * | 4/2000 | | F26B 5/04 |

(Continued)

OTHER PUBLICATIONS

International Search Report, Aug. 2010.

*Primary Examiner* — Steve M Gravini
(74) *Attorney, Agent, or Firm* — Clifford Kraft

(57) ABSTRACT

A low impact belt dryer is presented for drying pellets while minimizing high-energy pellet collisions that may create pellet dust or cause pellets to fracture. The dryer includes a vacuum chamber having multiple air knife assemblies that direct high velocity drying fluid towards the pellets and though a liquid-permeable pellet-impermeable belt to a vacuum port. The low impact dryer may also include a centrifugal dryer for dewatering the pellets before they pass though the vacuum chamber. The conveyor belt of the dryer may transport the pellets through multiple desiccation chambers where low velocity air is directed upwards though the belt to both dry and levitate the pellets above the belt. The dryer may also include a cleaning chamber for removing debris from the liquid-permeable pellet-impermeable belt.

15 Claims, 3 Drawing Sheets

(56) References Cited

U.S. PATENT DOCUMENTS

| | | | |
|---|---|---|---|
| 5,125,168 A * | 6/1992 | Aigeldinger | 34/92 |
| 5,528,839 A * | 6/1996 | Seidl | 34/364 |
| 5,911,488 A * | 6/1999 | Geromini et al. | 34/508 |
| 6,151,798 A * | 11/2000 | Petersen | 34/304 |
| 6,256,902 B1 * | 7/2001 | Flaherty et al. | 34/379 |
| 6,449,872 B1 * | 9/2002 | Olkku et al. | 34/380 |
| 6,470,597 B1 * | 10/2002 | Stipp | 34/422 |
| 6,592,364 B2 * | 7/2003 | Zapata et al. | 432/145 |
| 8,037,617 B2 * | 10/2011 | Kossowan | 34/61 |
| 2009/0095662 A1 * | 4/2009 | Redekop et al. | 209/509 |
| 2009/0211106 A1 * | 8/2009 | McKenzie | 34/92 |
| 2013/0074359 A1 * | 3/2013 | Jeong et al. | 34/389 |

FOREIGN PATENT DOCUMENTS

| | | | | |
|---|---|---|---|---|
| DE | 102008063661 | * | 6/2010 | C02F 11/12 |
| EP | 0 519173 A1 | * | 12/1992 | A24B 3/04 |
| FR | 2 905 286 A1 | | 3/2008 | |
| JP | 01226305 A | * | 9/1989 | B28B 1/52 |

* cited by examiner

LOW IMPACT BELT DRYER

FIELD OF THE INVENTION

This invention pertains to industrial dryers and, more particularly, belt dryers for drying pellets.

BACKGROUND OF THE INVENTION

Industrial drying equipment is typically used to dry the plastic pellets produced by underwater or water ring pelletizers. In underwater or water ring pelletizer applications, molten plastic is extruded through a die face where it is cut into a stream of liquid that cools the cut molten plastic to form pellets. The liquid is then typically separated from the pellets through dewatering and drying.

BRIEF SUMMARY OF THE INVENTION

In one exemplary embodiment of the present invention, a low impact pellet belt dryer includes a continuous conveyor belt for conveying pellets, where the conveyor belt is permeable to air. The conveyor belt is configured to pass through at least one vacuum chamber and at least one drying chamber and to deliver pellets to a pellet output port. The vacuum chamber includes at least one air knife configured to direct high velocity air towards the conveyor belt and at least one vacuum port for exhausting air and liquid stripped from pellets on the conveyor belt, where the vacuum port is configured to be attached to a vacuum blower to create negative pressure or a low pressure region. At least one diverter plate is movably mounted in the vacuum chamber adjacent to the air knife. A belt support for supporting the conveyor belt is mounted in the vacuum chamber between the conveyor belt and the vacuum port and has formed therein vacuum nozzles. The dryer includes at least one dryer chamber having an input port configured to be attached to a blower to generate positive pressure in the dryer chamber that causes air to flow through pellets on the conveyor belt toward an air exhaust of the dryer chamber.

BRIEF DESCRIPTION OF THE DRAWINGS

Certain aspects of the present invention will be described with reference to the following drawings, wherein.

DETAILED DESCRIPTION

When producing pellets using an underwater or water ring pelletizer, it is often a challenge to adequately dry the volume of plastic pellets produced without creating plastic dust from the impact of plastic pellets or high-energy particle collisions. The dust is typically produced when pellets impact one another or parts of the drying equipment forming plastic fragments and particles. The dust must typically be thoroughly removed from the industrial drying equipment in order to avoid contaminating subsequent batches of pellets, which may be of a different material or different color. The typically fine nature of the dust makes it difficult to completely remove the dust, which makes clean-out of conventional drying equipment a time consuming and expensive process.

In the present invention, pellets are deposited onto a continuous porous conveyer belt, which transports the pellets through one or more drying chambers for low impact drying. In one preferred embodiment, a vacuum stripper chamber utilizes multiple air knives in combination with a vacuum to strip water from the pellets. Each air knife produces a high velocity stream of fluid (or a high pressure jet), such as air, solvent or stream, that is directed towards the conveyor belt that transports the pellets. The conveyor belt is constructed of a porous material, such as a stainless steel wire mesh, that is permeable to the fluid of the high velocity stream as well as the liquid, but not the pellets or particles.

The conveyer belt preferably moves horizontally and the air knives are positioned above the belt. At least one vacuum port is disposed below the conveyer belt and is connected to a vacuum pump that generates negative pressure. The liquid is stripped from the pellets by the air knives and suctioned away through the vacuum port, where the liquid is either disposed of or preferably recycled. In a preferred embodiment, each air knife is provided with a corresponding vacuum port.

In a preferred embodiment, the vacuum stripper chamber includes vacuum nozzles, such as Teflon nozzles, that support the conveyor belt. The vacuum stripper chamber may include diverter plates disposed above the conveyor belt adjacent to the air knives to focus the stripping action of the high velocity streams of fluid. The position of the diverter plates is preferably laterally adjustable with respect to the air knives. The position of the diverter plates is also preferably adjustable angularly and vertically with respect to the conveyor belt. In operation, the positioning of the diverter plates affects the pellet drying effect by creating a turbulent movement of the pellets in the region between the deflector plate, the conveyor belt, and the air knife. The turbulent movement tends to cause the pellets to recycle within this region for greater drying action.

Figure 1:
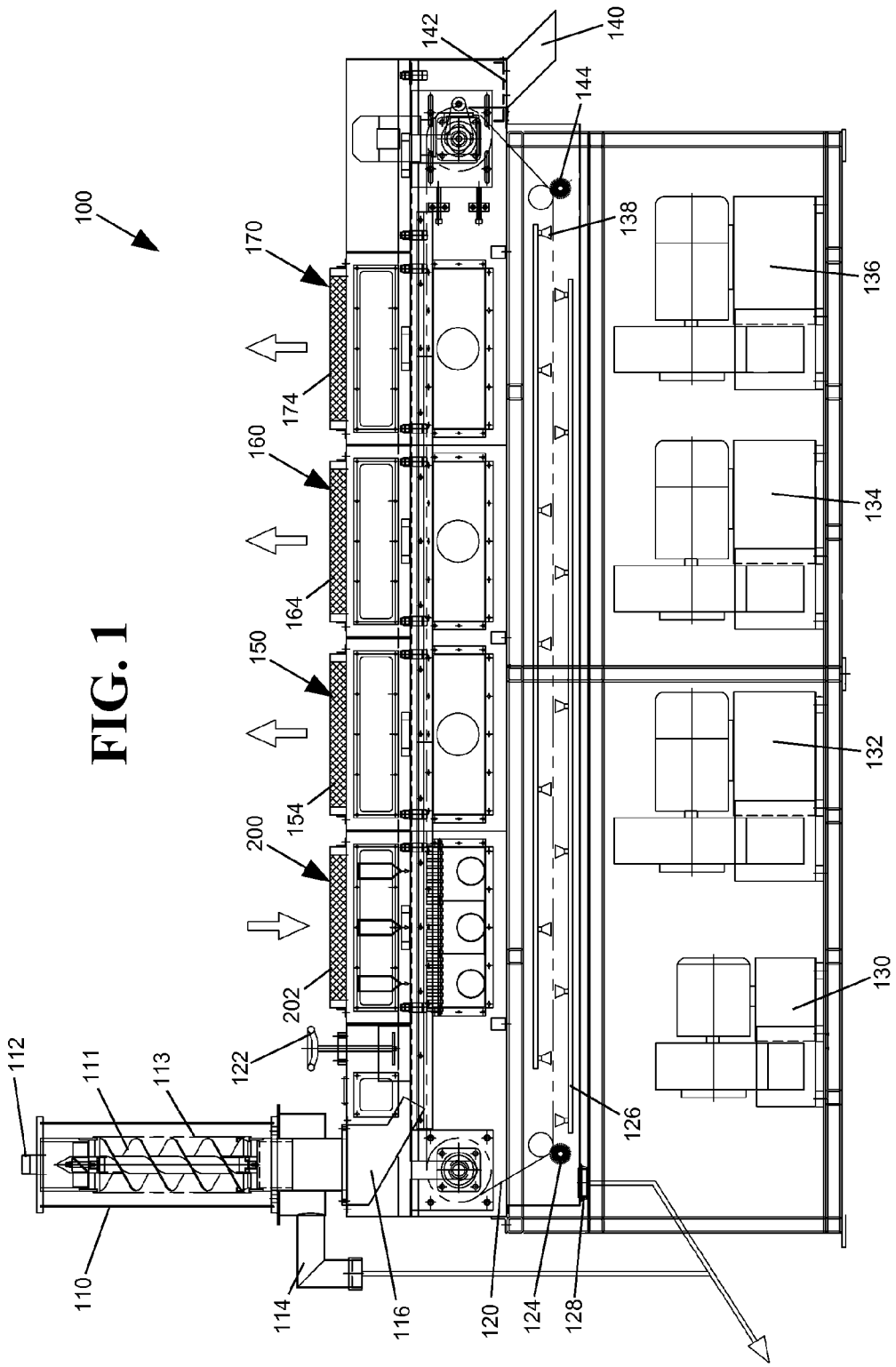
FIG. 1 is a cross-sectional schematic drawing illustrating a side view of an exemplary embodiment of a belt dryer in accordance with the present invention.

FIG. 1 is a cut-away schematic side view of an exemplary embodiment of a low impact pellet dryer 100 in accordance with certain aspects of the present invention. Dryer 100 includes centrifugal dewatering column 110 or centrifugal dryer with a housing or tower having an inlet port 112 for receiving a slurry or mixture of particles and fluid for dewatering and drying. The centrifugal dryer includes a rotor 111 for spinning the slurry and a fluid-permeable particle-impermeable porous mesh 113 around the rotor for separating a portion of the fluid from the pellets. The Dewatering column 110 removes a substantial amount of the liquid from the pellet slurry and the liquid flows out liquid removal port 114. Dewatered pellets exit dewatering column 110 through pellet discharge port 116 to a deposition section of the dryer where they are deposited on stainless steel mesh conveyor belt 120.

Conveyor belt 120 circulates within dryer 100 conveying pellets from discharge port 116 of dewatering column 110 through a air knife or vacuum chamber/compartment 200 and desiccation/drying chambers/compartments 150, 160, 170 to pellet outlet port 140. In this embodiment, conveyor belt 120 is a continuous stainless steel mesh of interwoven metal wires that is permeable to, in this example, the water from the pellet slurry and air. In one embodiment, conveyor belt 120 is constructed of a micro porous belt with, such as a Dutch weave belt that is both fluid-permeable and particle-impermeable. The micro porous belt having a transport surface with a plurality of pores with width less than 0.25 mm permits the dryer 100 to dry micro pellets, such as pellets that are approximately 0.25 to 0.75 millimeters in diameter. Alternatively, a belt with pores having a width less than 0.75 millimeters may be utilized in the dryer.

A distribution rake 122 spreads the pellets across a width of the conveyor belt 120 before the pellets enter air knife/vacuum chamber 200. Distribution rake 122 is preferably movably mounted so that the distance of the rake from conveyor belt 120 may be adjusted. Rake 122 may include mechanical fingers for distributing material or may be constructed using air nozzles that redistribute the pellets on belt 120.

Vacuum chamber 200 utilizes high velocity streams of fluid, e.g. air, and negative pressure to strip liquid from the pellets passing through on belt 120. The pellets then pass through one or more drying or desiccation chambers 150, 160, 170, which each have an input port 152, 162, 172 that is coupled to a corresponding blower 132, 134, 136 so that a low pressure jet of ambient, heated or cooled air can be driven upward through the belt, the drying chamber, and out an exhaust port 154, 164, 174 to further dry the pellets. In a preferred embodiment, drying or desiccation chambers 150, 160, 170 are configured to be a fluidizing chamber, wherein a positive flow of air from input port 152, 162, 172 to exhaust port 154, 164, 174 levitates pellets from the belt to improve fluidize the pellets and improve the drying effect. Note that exhaust port 154, 164, 174 may be equipped with filters to capture fines, angel hair, and dust from the pellets.

Fines may be generated by the cutter that produces the pellets or by friction in the transport piping or conveying of the slurry into the belt dryer. The fines may be classified or separated from the primary pellet material by the fluidizing chambers 150, 160, 170 and contained by filters or allowed to transit out as exhaust.

After exiting the drying chambers, the dried pellets travel via the belt to an exit section where the pellets drop through classification screen 142, which traps oversized pellets and agglomerate, to pellet discharge port 140.

On a return path of conveyor belt 120, the belt passes through a cleaning chamber/compartment with stainless steel brushes 124 and 144 that remove pellets and debris that fail to get deposited at pellet outlet port 140. Conveyor belt 120 passes between sprayer 126 and 138 on the return path, where the sprayers are configured to provide a high pressure spray of water or steam, for example, to further remove particulates from belt 120. Water flows out of dryer 100 via water discharge port 128. The high pressure spray provided by sprayers 126 and 138 permits the belt to be quickly and efficiently cleaned, particularly between batches having different types of pellets. Sprayers 126 and 138 are further illustrated in FIG. 2, which is a cross-section end view of dryer 100.

The cleaning of belt 120 may be automated or manual and may be performed by brushes, nozzles, air knives, steam, water, vacuum or other means, such as electrostatic, vibratory, high temperature generated by gas or electric sources. Quick access openings may be provided at one or more points adjacent to belt 120 to permit the belt to be accessed for inspection and cleaning. Access may aid cleaning in preparation for product change and secondary step cleaning, such as removal of tacky residue from the belt surface that is not accomplished by other cleaning mechanisms. Verification of the readiness of the belt dryer for the product change is also aided by providing quick access openings.

Figure 2:
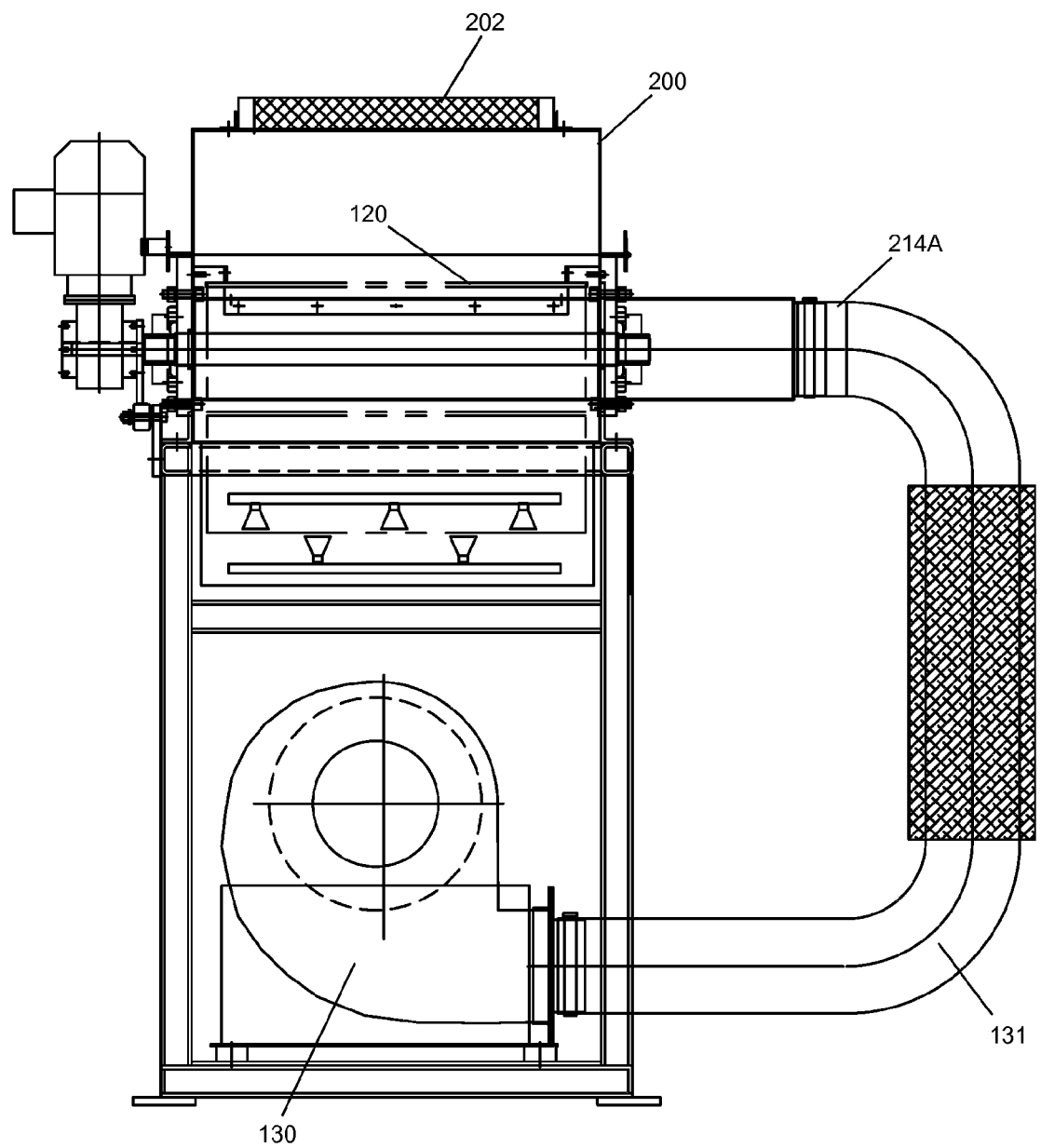
FIG. 2 is a cross-sectional schematic drawing illustrating an end view of the belt dryer of FIG. 1.
Figure 3:
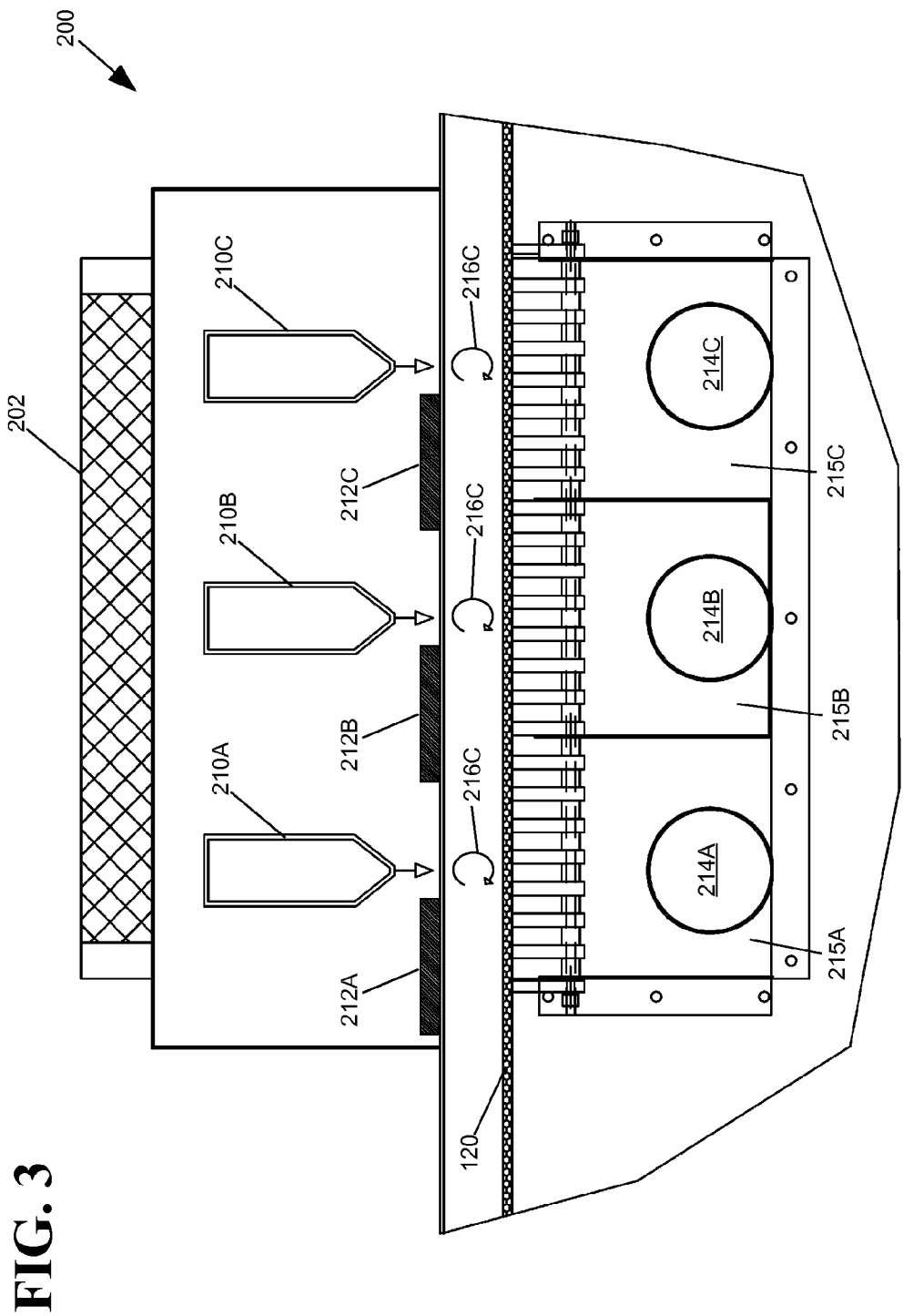
FIG. 3 is a cross-sectional schematic drawing illustrating a side view of an exemplary embodiment of a vacuum stripping chamber for the belt dryer of FIG. 1, the vacuum stripping chamber featuring multiple water stripping air knives for removing water from pellets using high velocity air streams and a vacuum exhaust.

FIG. 3 is a cross-sectional side view of an exemplary embodiment of vacuum chamber 200 of FIG. 1. As noted above, dryer 100 includes a vacuum blower 130, illustrated in FIGS. 1 and 2, that is coupled to vacuum ports 214A-C in order to introduce negative pressure into vacuum chamber 200. Vacuum chamber 200 includes a plurality of air knife assemblies that each assembly includes an air knife producing a high pressure jet blowing downward though the belt towards the vacuum port and a diverter plate located above the belt. The Vacuum chamber 200 includes multiple air knives 210A-C for directing a high velocity stream of fluid, which is air in this example, towards conveyor belt 120 for drying pellets on the belt. Multiple diverter plates 212A-C are disposed next to air knives 21OA-C. Vacuum ports 214A-C are connected to vacuum blower 130 by ductwork or hoses 131, as shown in FIG. 2. In the example shown, vacuum chamber 200 has three sub-chambers 215A-C corresponding to each of ports 214A-C. A belt supporter 204 supports conveyor belt 120. Belt support 204 is, in this example, constructed of strips of Teflon material and has formed therein vacuum nozzles that provide channels into the sub-chambers 215A-C, which have negative pressure during operation. Belt supporter 204 may also be constructed using other mechanisms or material, such as rollers that are sealed from open flow. Belt supporter 204 is preferably designed to accommodate high levels of mechanical downward force introduced by vacuum suction and maintains belt 120 at a fixed tension and level position.

Air from air intake 202 and air knives 210A-C passes through pellets on conveyor belt 120 stripping liquid from the pellets. The air and liquid are then pushed through the porous belt and pulled through the vacuum nozzles in belt support 204 by the vacuum ports 214A-C for removal. Note that while the number of air knives 210A-C, diverter plates 212A-C and vacuum ports 214A-C generally correspond to one another, e.g. three of each in the example shown, the number of these elements may be varied without departing from the teachings of the invention.

During operation, the high pressure air streams from air knives 210A-C tend to cause pellets to recirculate in the gaps between the diverter plates 212A-C, as represented by circular arrows 216A-C, which contributes to the water stripping and drying action of the vacuum chamber 200. The recirculating motion 216A-C typically moves the pellet product in a reverse direction to the direction of movement of belt 120. Diverter plates 212A-C are preferably movably mounted within vacuum chamber 200 so that the plates may be moved vertically, laterally or angularly relative to the air knifes and their respective high pressure jets to limit the movement of the drying pellets. Adjusting the position of diverter plates 212A-C affects the characteristics of the recirculating motion 216A-C of the pellets. The positioning of diverter plates 212A-C with respect to the direction of movement of belt 120, as well as the height above the belt 120 has the effect of causing the pellet materials to raise off belt 120 and roll backwards towards the inlet to the belt dryer, e.g. port 116. For example, moving diverter plates 212A-C vertically to increase the gap between the diverter plates and conveyor belt 120 tends to increase the volume of pellets recirculating within vacuum chamber 200, which provides increased time for stripping liquid from the pellets. It may be preferable in some applications to provide lathes or cross members on the surface of conveyor belt 120 that receives the pellets in order to increase the movement of pellets through the vacuum chamber 200.

A second or upper fluid-permeable particle-impermeable belt or ribbon may be provided above the belt 120 to aid in moving pellet product through the belt dryer. The upper belt or belts may be deployed along the length of belt 120 and move parallel to the lower belt, or along partial sections of belt 120. Each of the air knives may produce a high pressure jet blowing though both the upper ribbon and the lower belt. The upper belt may control or constrain the recirculating movement 216A-C within stripping chamber 200. The upper belt may be useful in limiting the rise of pellets from belt 120 within the drying chambers 150, 160 and 170, where the pellets typically become fluidized by the flow of air upward through the chambers. The upper belt may be of particular use when drying small sized products, such as micro-pellets. In another embodiment, a top screen or plate at a fixed or movable distance from the surface of belt 120 may be utilized.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. A low impact centrifugal dryer for separating fluid from particles, the dryer comprising:
   a fluid-permeable particle-impermeable belt for conveying particles though the dryer;
   an air knife chamber including:
     a high pressure jet blowing downward upon the belt to push fluid from the particles through the belt, and
     a vacuum port located below the belt;
   a housing with an inlet port for receiving a slurry of particles and fluid,
   a rotor within the housing for spinning the slurry,
   a fluid-permeable particle-impermeable mesh within the housing and disposed around the rotor for separating a portion of the fluid from the particles; and,
   a discharge port in the housing for sending the particles to the belt; a low pressure let blowing upward through the belt to an exhaust port; wherein the belt transports the particles from the air knife;
   a first and second desiccation chamber, each desiccation chamber including
   a low pressure jet blowing upward through the belt to an exhaust port; wherein the belt transports the particles from the air knife chamber through the first desiccation chamber to the second desiccation chamber;
   wherein the air knife chamber includes:
   a plurality of knife assemblies wherein each knife assembly includes
   one high pressure jet blowing downward through the belt towards one vacuum port;
   wherein each knife assembly further includes a laterally adjustable diverter plate positioned above the belt.

2. The low impact dryer of claim 1 wherein the particles are levitated above the belt by the low pressure jet.

3. The low impact dryer of claim 1 further comprising
   a fluid-permeable particle-impermeable ribbon moving parallel to the belt through the air knife chamber,
   wherein each of the knife assembly includes
   one high pressure jet blowing downward through the ribbon to the belt towards one vacuum port.

4. The low impact dryer of claim 3 wherein the belt includes a plurality of pores, wherein each pore has a width less than 0.75 millimeters.

5. The low impact dryer of claim 3 wherein the belt includes a plurality of pores, wherein each pore has a width less than 0.25 millimeters.

6. The low impact dryer of claim 1 wherein the air knife chamber includes a diverter plate positioned above the belt, and wherein the diverter plate is moveably mounted relative to the high pressure jet.

7. The low impact dryer of claim 1 wherein a low pressure region is created at the vacuum port of the air knife chamber by a remotely located vacuum pump.

8. The low impact dryer of claim 6 wherein the diverter plate is laterally, angularly, and vertically moveable relative to the high pressure jet.

9. The low impact dryer of claim 1 further comprising
   a rotation dryer including
     a tower with an inlet port for receiving a mixture of particles and fluid,
     a rotor within the tower for rotating the mixture,
       a porous mesh within the housing and disposed around the rotor for separating a portion of the fluid from the mixture, and
       a discharge port in the tower for sending the particles to the belt;
   the air knife chamber including
     a plurality of knife assemblies wherein each knife assembly includes:
   at least one high pressure jet blowing downward through the belt towards one vacuum; a distribution rake spreading pellets across the belt,
     wherein the belt transports the pellets from the distribution rake to the air knife chamber.

10. The low impact dryer of claim 9 further comprising:
    a desiccation chamber including a low pressure jet blowing upward through the belt to an exhaust port; wherein the belt transports the particles from the air knife chamber to the desiccation chamber, and the particles are levitated above the belt by the low pressure jet.

11. The low impact dryer of claim 10 wherein the air knife chamber includes
    a plurality of knife assemblies wherein each knife assembly includes
    at least one high pressure jet blowing downward through the belt towards one vacuum port, and a laterally adjustable diverter plate positioned above the belt.

12. The low impact dryer of claim 11 further comprising:
    a deposition section wherein the particles are received from the discharge port and deposited onto the belt,
    an exit section wherein the particles are removed from the belt; and a cleaning chamber including a plurality of metal brushes for scrubbing the belt; wherein the belt moves from the exit section through the cleaning chamber to the deposition section.

13. The low impact dryer of claim 1 wherein the belt includes a transport surface having a plurality of pores, wherein each pore has a width less than 0.75 millimeters.

14. The low impact dryer of claim 13 further comprising:
the deposition section wherein the particles are placed on the belt,
an exit section wherein the particles are removed from the belt; and a cleaning chamber including a plurality of metal brushes for scrubbing the belt; wherein the belt moves from the exit section through the cleaning chamber to the deposition section.

15. The low impact dryer of claim 14 wherein the cleaning chamber includes high pressure spray for dislodging debris from the belt.

\* \* \* \* \*